US008986150B2

(12) United States Patent
Versteyhe et al.

(10) Patent No.: US 8,986,150 B2
(45) Date of Patent: Mar. 24, 2015

(54) BALL TYPE CONTINUOUSLY VARIABLE TRANSMISSION/INFINITELY VARIABLE TRANSMISSION

(71) Applicant: Dana Limited, Maumee, OH (US)

(72) Inventors: Mark R. J. Versteyhe, Oostkamp (BE); Matthias W. J. Byltiauw, Hooglede (SE); James F. Ziech, Kalamazoo, MI (US)

(73) Assignee: Dana Limited, Maumee, OH (US)

( * ) Notice: Subject to any disclaimer, the term of this patent is extended or adjusted under 35 U.S.C. 154(b) by 0 days.

(21) Appl. No.: 14/020,593

(22) Filed: Sep. 6, 2013

(65) Prior Publication Data

US 2014/0194243 A1    Jul. 10, 2014

Related U.S. Application Data

(60) Provisional application No. 61/698,005, filed on Sep. 7, 2012, provisional application No. 61/782,924, filed on Mar. 14, 2013.

(51) Int. Cl.
*F16H 15/50* (2006.01)
*F16H 37/08* (2006.01)
*F16H 15/52* (2006.01)

(52) U.S. Cl.
CPC .............. *F16H 15/503* (2013.01); *F16H 15/52* (2013.01); *F16H 37/0853* (2013.01); *F16H 2037/0873* (2013.01); *F16H 2037/0893* (2013.01)
USPC ............................ 475/214; 475/209; 475/282

(58) Field of Classification Search
USPC ............................ 475/209, 214, 282, 196, 189
See application file for complete search history.

(56) References Cited

U.S. PATENT DOCUMENTS

| | | | |
|---|---|---|---|
| 1,063,244 | A | 6/1913 | Dieterich |
| 2,019,006 | A | 10/1935 | Ferrari |
| 2,060,884 | A | 11/1936 | Madle |
| 2,660,897 | A | 12/1953 | Neidhart et al. |
| 2,931,235 | A | 4/1960 | Hayward |
| 3,203,278 | A | 8/1965 | General |
| 3,470,720 | A | 10/1969 | Eklund et al. |
| 3,831,245 | A | 8/1974 | Amos |
| 3,894,559 | A | 7/1975 | DePuy |
| 4,046,988 | A | 9/1977 | Okuda et al. |

(Continued)

FOREIGN PATENT DOCUMENTS

| | | |
|---|---|---|
| AU | 2011224083 A1 | 10/2011 |
| DE | 3245045 A1 * | 6/1984 |

(Continued)

OTHER PUBLICATIONS

PCT/US2014/038439 International Search Report and Written Opinion dated Sep. 30, 2014.

(Continued)

*Primary Examiner* — Roger Pang
(74) *Attorney, Agent, or Firm* — Wilson Sonsini Goodrich & Rosati

(57) ABSTRACT

A variable transmission includes an input shaft, a planetary gear set drivingly engaged with a variator comprising, a variator carrier assembly, a first ring assembly, and a second ring assembly; and the output shaft, arranged with various combinations of brakes and clutches to produce transmissions with continuously variable or infinitely variable torque output ratios.

5 Claims, 7 Drawing Sheets

(56) References Cited

U.S. PATENT DOCUMENTS

| | | | |
|---|---|---|---|
| 4,226,140 A | 10/1980 | Gaasenbeek | |
| 4,464,952 A * | 8/1984 | Stubbs | 475/216 |
| 4,693,134 A | 9/1987 | Kraus | |
| 4,784,017 A | 11/1988 | Johnshoy | |
| 4,856,371 A | 8/1989 | Kemper | |
| 4,856,374 A | 8/1989 | Kreuzer | |
| 4,963,122 A | 10/1990 | Ryan | |
| 4,963,124 A | 10/1990 | Takahashi et al. | |
| 5,230,670 A * | 7/1993 | Hibi | 475/214 |
| 5,238,460 A | 8/1993 | Esaki et al. | |
| 5,318,486 A * | 6/1994 | Lutz | 475/214 |
| 5,401,221 A | 3/1995 | Fellows et al. | |
| 5,520,588 A | 5/1996 | Hall, III | |
| 5,577,423 A | 11/1996 | Mimura | |
| 5,599,251 A | 2/1997 | Beim et al. | |
| 5,730,678 A | 3/1998 | Larkin | |
| 5,776,028 A | 7/1998 | Matsuda et al. | |
| 5,800,303 A | 9/1998 | Benford | |
| 5,860,888 A | 1/1999 | Lee | |
| 5,971,883 A | 10/1999 | Klemen | |
| 5,996,226 A | 12/1999 | Gibbs | |
| 6,045,477 A | 4/2000 | Schmidt | |
| 6,053,839 A | 4/2000 | Baldwin et al. | |
| 6,059,685 A | 5/2000 | Hoge et al. | |
| 6,071,208 A | 6/2000 | Koivunen | |
| 6,083,135 A | 7/2000 | Baldwin et al. | |
| 6,086,504 A | 7/2000 | Illerhaus | |
| 6,089,287 A | 7/2000 | Welsh et al. | |
| 6,155,951 A | 12/2000 | Kuhn et al. | |
| 6,217,474 B1 | 4/2001 | Ross et al. | |
| 6,251,038 B1 | 6/2001 | Ishikawa et al. | |
| 6,273,838 B1 | 8/2001 | Park | |
| 6,342,026 B1 | 1/2002 | Takagi et al. | |
| 6,358,178 B1 | 3/2002 | Wittkopp | |
| 6,371,880 B1 | 4/2002 | Kam | |
| 6,554,735 B2 | 4/2003 | Kanazawa | |
| 6,558,285 B1 | 5/2003 | Sieber | |
| 6,585,619 B2 | 7/2003 | Henzler | |
| 6,641,497 B2 | 11/2003 | Deschamps et al. | |
| 6,705,964 B2 | 3/2004 | Nagai et al. | |
| 6,719,659 B2 | 4/2004 | Geiberger et al. | |
| 6,723,016 B2 | 4/2004 | Sumi | |
| 6,726,590 B2 | 4/2004 | Henzler et al. | |
| 6,733,412 B2 | 5/2004 | Kumagai et al. | |
| 6,793,603 B2 | 9/2004 | Teraoka et al. | |
| 6,849,020 B2 | 2/2005 | Sumi | |
| 6,866,606 B2 | 3/2005 | Ooyama | |
| 6,949,045 B2 | 9/2005 | Wafzig et al. | |
| 6,979,275 B2 * | 12/2005 | Hiraku et al. | 475/214 |
| 7,033,298 B2 | 4/2006 | Usoro et al. | |
| 7,074,154 B2 | 7/2006 | Miller | |
| 7,104,917 B2 | 9/2006 | Klemen et al. | |
| 7,128,681 B2 | 10/2006 | Sugino et al. | |
| 7,160,220 B2 | 1/2007 | Shinojima et al. | |
| 7,186,199 B1 | 3/2007 | Baxter, Jr. | |
| 7,234,543 B2 | 6/2007 | Schaaf | |
| 7,288,044 B2 | 10/2007 | Gumpoltsberger | |
| 7,335,126 B2 | 2/2008 | Tsuchiya et al. | |
| 7,347,801 B2 | 3/2008 | Guenter et al. | |
| 7,396,309 B2 | 7/2008 | Heitz et al. | |
| 7,470,210 B2 | 12/2008 | Miller et al. | |
| 7,473,202 B2 | 1/2009 | Morscheck et al. | |
| 7,485,069 B2 | 2/2009 | Jang et al. | |
| 7,497,798 B2 | 3/2009 | Kim | |
| 7,637,838 B2 | 12/2009 | Gumpoltsberger | |
| 7,686,729 B2 | 3/2010 | Miller et al. | |
| 7,717,815 B2 | 5/2010 | Tenberge | |
| 7,727,107 B2 | 6/2010 | Miller | |
| 7,780,566 B2 | 8/2010 | Seo | |
| 7,878,935 B2 | 2/2011 | Lahr | |
| 7,951,035 B2 | 5/2011 | Platt | |
| 7,980,972 B1 | 7/2011 | Starkey et al. | |
| 8,029,401 B2 | 10/2011 | Johnson | |
| 8,066,614 B2 | 11/2011 | Miller et al. | |
| 8,142,323 B2 | 3/2012 | Tsuchiya et al. | |
| 8,257,216 B2 | 9/2012 | Hoffman | |
| 8,257,217 B2 | 9/2012 | Hoffman | |
| 8,287,414 B2 | 10/2012 | Weber et al. | |
| 8,313,404 B2 | 11/2012 | Carter et al. | |
| 8,382,636 B2 | 2/2013 | Shiina et al. | |
| 8,870,711 B2 | 10/2014 | Pohl et al. | |
| 8,888,643 B2 | 11/2014 | Lohr et al. | |
| 2002/0094911 A1 | 7/2002 | Haka | |
| 2002/0169048 A1 | 11/2002 | Henzler et al. | |
| 2003/0060318 A1 | 3/2003 | Sumi | |
| 2003/0181280 A1 | 9/2003 | Elser et al. | |
| 2003/0216121 A1 | 11/2003 | Yarkosky | |
| 2003/0228952 A1 | 12/2003 | Joe et al. | |
| 2004/0058769 A1 | 3/2004 | Larkin | |
| 2004/0061639 A1 | 4/2004 | Voigtlaender et al. | |
| 2004/0171452 A1 | 9/2004 | Miller et al. | |
| 2005/0102082 A1 | 5/2005 | Joe et al. | |
| 2005/0153810 A1 | 7/2005 | Miller et al. | |
| 2006/0234822 A1 | 10/2006 | Morscheck et al. | |
| 2007/0021259 A1 | 1/2007 | Tenberge | |
| 2007/0042856 A1 | 2/2007 | Greenwood | |
| 2007/0072732 A1 | 3/2007 | Klemen | |
| 2007/0270270 A1 | 11/2007 | Miller et al. | |
| 2007/0275808 A1 | 11/2007 | Iwanaka et al. | |
| 2008/0039273 A1 | 2/2008 | Smithson et al. | |
| 2008/0121487 A1 | 5/2008 | Miller et al. | |
| 2008/0185201 A1 | 8/2008 | Bishop | |
| 2009/0017959 A1 | 1/2009 | Triller | |
| 2009/0048054 A1 | 2/2009 | Tsuchiya et al. | |
| 2009/0062064 A1 | 3/2009 | Kamada et al. | |
| 2009/0221391 A1 | 9/2009 | Bazyn et al. | |
| 2009/0221393 A1 | 9/2009 | Kassler | |
| 2009/0312137 A1 * | 12/2009 | Rohs et al. | 475/214 |
| 2010/0056322 A1 | 3/2010 | Thomassy | |
| 2010/0093476 A1 | 4/2010 | Carter et al. | |
| 2010/0093479 A1 | 4/2010 | Carter et al. | |
| 2010/0113211 A1 | 5/2010 | Schneider et al. | |
| 2010/0141193 A1 | 6/2010 | Rotondo et al. | |
| 2010/0244755 A1 | 9/2010 | Kinugasa et al. | |
| 2010/0267510 A1 | 10/2010 | Nichols et al. | |
| 2010/0282020 A1 | 11/2010 | Greenwood et al. | |
| 2010/0304915 A1 | 12/2010 | Lahr | |
| 2011/0034284 A1 | 2/2011 | Pohl et al. | |
| 2011/0152031 A1 | 6/2011 | Schoolcraft | |
| 2011/0165982 A1 | 7/2011 | Hoffman et al. | |
| 2011/0165985 A1 | 7/2011 | Hoffman et al. | |
| 2011/0165986 A1 | 7/2011 | Hoffman et al. | |
| 2011/0230297 A1 | 9/2011 | Shiina et al. | |
| 2011/0319222 A1 | 12/2011 | Ogawa et al. | |
| 2012/0024991 A1 | 2/2012 | Pilch et al. | |
| 2012/0035016 A1 | 2/2012 | Miller et al. | |
| 2012/0040794 A1 | 2/2012 | Schoolcraft | |
| 2012/0122624 A1 | 5/2012 | Hawkins, Jr. et al. | |
| 2012/0142477 A1 | 6/2012 | Winter | |
| 2012/0165154 A1 | 6/2012 | Wittkopp et al. | |
| 2012/0231925 A1 | 9/2012 | Shiina et al. | |
| 2012/0244990 A1 | 9/2012 | Ogawa et al. | |
| 2012/0309579 A1 | 12/2012 | Miller et al. | |
| 2013/0130859 A1 * | 5/2013 | Lundberg et al. | 475/214 |
| 2013/0190131 A1 | 7/2013 | Versteyhe et al. | |
| 2014/0194242 A1 | 7/2014 | Cooper | |
| 2014/0274536 A1 | 9/2014 | Versteyhe et al. | |

FOREIGN PATENT DOCUMENTS

| | | |
|---|---|---|
| DE | 102005010751 | 9/2006 |
| EP | 0210053 A2 | 7/1985 |
| EP | 1061288 | 12/2000 |
| EP | 2113056 | 7/2012 |
| FR | 1030702 | 6/1953 |
| FR | 2918433 | 1/2009 |
| GB | 2248895 A2 | 4/1992 |
| JP | H-09-119506 | 5/1997 |
| JP | 2008-180214 | 8/2008 |
| WO | WO2006/002457 | 1/2006 |
| WO | WO2006/041718 | 4/2006 |
| WO | WO2007/046722 | 4/2007 |
| WO | WO2007/051827 | 5/2007 |
| WO | WO2008/103543 | 8/2008 |

(56) References Cited

FOREIGN PATENT DOCUMENTS

| WO | WO2011/011991 | 2/2011 |
|----|---------------|--------|
| WO | WO2012/008884 | 1/2012 |
| WO | WO2013/109723 | 7/2013 |
| WO | WO2013/123117 | 8/2013 |
| WO | WO2014/039438 | 3/2014 |
| WO | WO2014/039439 | 3/2014 |
| WO | WO2014/039440 | 3/2014 |
| WO | WO2014/039447 | 3/2014 |
| WO | WO2014/039448 | 3/2014 |
| WO | WO2014/039708 | 3/2014 |
| WO | WO2014/039713 | 3/2014 |
| WO | WO2014/039846 | 3/2014 |
| WO | WO2014/039900 | 3/2014 |
| WO | WO2014/039901 | 3/2014 |
| WO | WO2014/078583 | 5/2014 |
| WO | WO2014/151889 | 9/2014 |
| WO | WO2014/159755 | 10/2014 |
| WO | WO2014/159756 | 10/2014 |
| WO | WO2014/165259 | 10/2014 |
| WO | WO2014/197711 | 12/2014 |

OTHER PUBLICATIONS

PCT/US2014/041124 International Search Report and Written Opinion dated Oct. 15, 2014.
Moore et al, A Three Revolute Cobot Using CVTs in Parallel, Proceedings of IMECE, 1999, 6 pgs.
PCT/US2013/021890 International Search Report dated Apr. 10, 2013.
PCT/US2013/026037 International Search Report dated Jul. 15, 2013.
PCT/US2013/057837 International Search Report and Written Opinion dated Mar. 31, 2014.
PCT/US2013/057866 International Search Report dated Feb. 11, 2014.
PCT/US2013/058309 International Search Report and Written Opinion dated Feb. 11, 2014.
PCT/US2013/058318 International Search Report and Written Opinion dated Feb. 11, 2014.
PCT/US2013/058545 International Search Report and Written Opinion dated Feb. 19, 2014.
PCT/US2013/058616 International Search Report and Written Opinion dated Feb. 11, 2014.
PCT/US2013/070177 International Search Report and Written Opinion dated Apr. 14, 2014.
PCT/US2013/57838 International Search Report and Written Opinion dated Jan. 17, 2014.
PCT/US2013/57839 International Search Report and Written Opinion dated Feb. 6, 2014.
PCT/US2013/57868 International Search Report and Written Opinion dated Apr. 9, 2014.
PCT/US2013/58615 International Search Report and Written Opinion dated Feb. 11, 2014.
PCT/US2014/25001 International Search Report and Written Opinion dated Jul. 14, 2014.
PCT/US2014/25005 International Search Report and Written Opinion dated Jul. 14, 2014.
PCT/US2014/25004 International Search Report and Written Opinion dated Jul. 14, 2014.
U.S. Appl. No. 61/819,414, filed May 3, 2013, Phillips et al.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
PCT/US2013/026037 International Preliminary Report on Patentability dated Aug. 28, 2014.
PCT/US2014/036623 International Search Report and Written Opinion dated Sep. 4, 2014.
PCT/US2014/26619 International Search Report and Written Opinion dated Sep. 9, 2014.
PCT/US2014/036621 International Search Report and Written Opinion dated Sep. 4, 2014.
U.S. Appl. No. 14/017,054 Office Action dated Aug. 27, 2014.
Wong. The Temple of VTEC Asia Special Focus on the Multimatic Transmission. Temple of VTEC Asia. 2000.
U.S. Appl. No. 14/017,054 Office Action dated Dec. 12, 2014.

* cited by examiner

BALL TYPE CONTINUOUSLY VARIABLE TRANSMISSION/INFINITELY VARIABLE TRANSMISSION

CROSS-REFERENCES TO RELATED APPLICATIONS

The present application claims priority to U.S. Provisional Patent Application No. 61/698,005, filed Sep. 7, 2012 and U.S. Provisional Patent Application No. 61/782,924, filed Mar. 14, 2013, which applications are incorporated herein by reference.

BACKGROUND OF THE INVENTION

Automatic and manual transmissions are commonly used on automobile vehicles. Those transmissions are becoming more and more complicated since the engine speed has to be more precisely controlled to limit the fuel consumption and the emissions of cars. This finer control of the engine speed in usual transmissions can only be done by adding more discrete step ratio gears and increasing the overall complexity and cost. Consequently, 6-speed manual transmissions then become more frequently used as are 8 or 9 speed automatic transmissions.

SUMMARY OF THE INVENTION

Provided herein is a variable transmission comprising; a power input shaft; a planetary gear set mechanically coupled to the power input shaft, a variator comprising, a variator carrier assembly, a first ring assembly, and a second ring assembly; and various combinations of brakes and clutches.

In any of the embodiments disclosed herein the variable transmission may be a continuously variable transmission In some embodiments, the variable transmission comprises a variator having a continuously variable mode, an infinitely variable mode or a combination thereof.

In some embodiments the variable transmission can provide a reverse function, a standstill function and a low speed function.

In some embodiments, the transition between continuously variable transmission mode and infinitely variable transmission mode is accomplished by simultaneously releasing one of the brakes and applying the other brake.

In some embodiments, the transition between continuously variable transmission mode and infinitely variable transmission mode is accomplished by releasing the clutch and engaging the brake.

In some embodiments, the variator is able to continuously change its torque ratios in both the continuously variable mode and infinitely variable mode to provide the best ratio achievable for the engine to optimize performance or fuel consumption.

Provided herein is a variable transmission comprising: an input shaft; a planetary gear set, wherein a carrier of the planetary gear set is drivingly engaged with the input shaft; a first brake mechanically coupled to a ring gear of the planetary gear set; a variator comprising a variator carrier assembly, a first ring assembly, and a second ring assembly, wherein the variator carrier assembly is mechanically coupled to the ring gear of the planetary gear set; and a second brake is mechanically coupled to a sun gear of the planetary gear set and to the first ring assembly of the variator, and wherein the second ring assembly of the variator assembly is drivingly engaged to the output of the variable transmission.

In some embodiments, the variable transmission comprises a continuously variable mode and an infinitely variable mode. In some embodiments, when the first brake is engaged and the second brake is disengaged, the ring gear of the planetary gear set and the variator carrier assembly are held fixed, thereby engaging a continuously variable mode. In some embodiments, power passes through the sun gear of the planetary gear set to the first ring assembly when the transmission is in continuously variable mode.

In some embodiments, when the second brake is engaged and the first brake is disengaged, the sun gear of the planetary gear set and the first ring assembly are held fixed, thereby engaging an infinitely variable mode. In some embodiments, power passes through the ring gear of the planetary gear set to variator carrier assembly in the infinitely variable mode. In some embodiments, in the infinitely variable mode, the variator provides a reverse function, a standstill function and a low speed function.

In some embodiments, a transition between continuously variable mode and infinitely variable mode is accomplished by simultaneously releasing one of the first brake and the second brake while applying the other of the first brake and the second brake. In some embodiments, the variator continuously changes its torque ratios in both the continuously variable mode and infinitely variable mode to optimize performance or fuel consumption. In some embodiments, the variator continuously changes its torque ratios in both the continuously variable mode and infinitely variable mode to achieve an ideal ratio for variable transmission.

In some embodiments, the continuously variable mode and infinitely variable mode provide a gap in rotation speeds of the second ring assembly. In one embodiment, the gap is compensated by engine speed adjustment. In some embodiments, the relationship of rotation speeds of the second ring assembly in the continuously variable mode and the second ring assembly in the infinitely variable mode, and the rotation speed of the input shaft from the engine is as shown in FIG. 5.

Provided herein is a variable transmission comprising: an input shaft; a planetary gear set, wherein a ring gear of the planetary gear set is drivingly engaged with the input shaft; a variator comprising a variator carrier assembly, a first ring assembly, and a second ring assembly; a planetary gear carrier of the planetary gear set coupled to a first brake and to the second ring assembly; and a sun gear of the planetary gear set coupled to a second brake and the variator carrier assembly, and wherein the second ring assembly of the variator is drivingly engaged to the output of the variable transmission.

In some embodiments, the variable transmission comprises a continuously variable mode and an infinitely variable mode.

In some embodiments, when the second brake is engaged and the first brake is disengaged, the sun gear of the planetary gear set is fixed together with the variator carrier assembly to engage a continuously variable mode. In some embodiments, input power passes through the ring gear of the planetary gear set to the first ring assembly when the transmission is in continuously variable mode.

In some embodiments, when the first brake is engaged and the second brake is disengaged, the first ring assembly of the variator and the planetary gear carrier are held fixed, to engage an infinitely variable mode. In some embodiments, in the infinitely variable mode, the variator provides a reverse function, a standstill function, and a low speed function.

In some embodiments, a transition between continuously variable mode and infinitely variable mode is accomplished by simultaneously releasing one of the first brake and the second brake while applying the other of the first brake and the second brake.

In some embodiments, the variator continuously changes its torque ratios in both the continuously variable mode and infinitely variable mode to optimize performance or fuel consumption. In some embodiments, the variator continuously changes its torque ratios in both the continuously variable mode and infinitely variable mode to achieve an ideal ratio for variable transmission.

In some embodiments, the continuously variable mode and infinitely variable mode have overlapping rotation speeds of the second ring assembly (or transmission output). In some embodiments, rotation speed range of the infinitely variable mode is wider than the rotation speed in the continuously variable mode. In some embodiments, the relationship of rotation speeds of the second ring assembly in the continuously variable mode and the second ring assembly in the infinitely variable mode, and the rotation speed of the input shaft from the engine is as shown in FIG. 7.

Provided herein is a variable transmission comprising: an input shaft; a variator comprising a first ring assembly, a second ring assembly, and a carrier assembly; a planetary gear set comprising a sun gear drivingly engaged with the input shaft, a ring gear drivingly engaged with the variator carrier assembly, and one or more planet gears on a planet carrier, the planet gears disposed in mechanical engagement between the sun gear and the ring gear; a first brake coupled to the ring gear and configured to hold the ring gear fixed when the first brake is engaged; and a second brake coupled to the planet carrier and the first ring assembly, and configured to hold the planet carrier fixed when the second brake is engaged; and wherein the second ring assembly is drivingly engaged with the output of the variable transmission.

In some embodiments, the variable transmission comprises a continuously variable mode and an infinitely variable mode.

In some embodiments, when the first brake is engaged and the second brake is disengaged, the ring gear and the variator carrier assembly are fixed to engage a continuously variable mode. In some embodiments, input power passes through the planetary carrier to the first ring assembly when the transmission is in the continuously variable mode.

In some embodiments, when the second brake is engaged and the first brake is disengaged, the planet carrier and the first ring assembly are held fixed by the second brake to engage an infinitely variable mode. In some embodiments, power passes through the ring gear of the planetary gear set, to the variator carrier assembly when the transmission is in the infinitely variable mode. In some embodiments, in the infinitely variable mode the variator provided a reverse function, a standstill function and a low speed function.

In some embodiments, a transition between continuously variable mode and infinitely variable mode is accomplished by simultaneously releasing one of the first brake and the second brake while applying the other of the first brake and the second brake.

In some embodiments, the variator continuously changes its torque ratios in both the continuously variable mode and infinitely variable mode to optimize performance or fuel consumption. In some embodiments, the variator continuously changes its torque ratios in both the continuously variable mode and infinitely variable mode to achieve an ideal ratio for variable transmission.

In some embodiments, the continuously variable mode and infinitely variable mode provide overlapping rotation speeds of the second ring assembly. In some embodiments, the continuously variable mode and infinitely variable mode have lower rotation speeds of the second ring assembly than a rotation speed of the input shaft. In some embodiments, the relationship of rotation speeds of the second ring assembly in the continuously variable mode and the second ring assembly in the infinitely variable mode, and the rotation speed of the input shaft from the engine is as shown in FIG. 9.

Provided herein is a variable transmission comprising: an input shaft, a variator comprising a first ring assembly, a second ring assembly, and a carrier assembly, wherein the second ring assembly is drivingly engaged to an output of the variable transmission; a planetary gear set comprising a sun gear drivingly engaged with the input shaft, a ring gear drivingly engaged with the second ring assembly, and one or more planet gears on a planet carrier, the planet gears disposed in mechanical engagement between the sun gear and the ring gear; a first brake coupled to the first ring assembly and configured to hold the ring gear of the planetary gear set and the first ring assembly fixed when the first brake is engaged; and a second brake coupled to the planet carrier and the variator carrier assembly, and configured to hold the planet carrier and the variator carrier assembly fixed when the second brake is engaged.

In some embodiments, the variable transmission comprises a continuously variable mode and an infinitely variable mode.

In some embodiments, when the second brake is engaged and the first brake is disengaged, the planet carrier and the variator carrier assembly are held fixed to engage a continuously variable mode. In some embodiments, power passes through the planetary gear set ring gear and goes to the first ring assembly when the transmission is in the continuously variable mode.

In some embodiments, when the first brake is engaged and the second brake is disengaged, the ring gear and the first ring assembly are held fixed to engage an infinitely variable mode. In some embodiments, power passes through the planet carrier to the variator carrier assembly when the transmission is in the infinitely variable mode.

In some embodiments, in the infinitely variable mode the variator provides a reverse function, a standstill function and a low speed function. In some embodiments, a transition between continuously variable mode and infinitely variable mode is accomplished by simultaneously releasing one of the first brake and the second brake while applying the other of the first brake and the second brake.

In some embodiments, the variator continuously changes its torque ratios in both the continuously variable mode and infinitely variable mode to optimize performance or fuel consumption. In some embodiments, the variator continuously changes its torque ratios in both the continuously variable mode and infinitely variable mode to achieve an ideal ratio for variable transmission.

In some embodiments, the continuously variable mode and infinitely variable mode provide a gap in rotation speeds of the second ring assembly. In one embodiment, the gap is compensated by engine speed adjustment. In some embodiments, the relationship of rotation speeds of the second ring assembly in the continuously variable mode and the second ring assembly in the infinitely variable mode, and the rotation speed of the CVT input from the engine is as shown in FIG. 11.

Provided herein is a variable transmission comprising: an input shaft; a clutch comprising a first clutch member coupled to the input shaft and a second clutch member; a variator comprising, a carrier assembly, a first ring assembly having the second clutch member formed thereon, and a second ring assembly, and wherein the second ring assembly is drivingly engaged to an output of the variable transmission; a planetary gear set comprising a sun gear drivingly engaged with the input shaft, one or more planet gears on a planet carrier, wherein the planet carrier is drivingly engaged with the variator carrier, and wherein a ring gear of the planetary gear set is held fixed; and a first brake coupled to the first ring assembly configured to hold the first ring assembly fixed when the first brake is engaged, wherein the first ring assembly is drivingly engaged with the input shaft when the first clutch member engages the second clutch member.

In some embodiments, the variable transmission comprises a combined continuously variable/infinitely variable mode (CVP/IVP mode), or an infinitely variable mode.

In some embodiments, when the clutch is engaged, both the first ring assembly and the variator carrier are driven in order to engage the combined continuously variable/infinitely variable mode (CVP/IVP mode). In some embodiments, the variable transmission in the combined continuously variable/infinitely variable mode generates rotation speeds of the second ring assembly between speeds generated in a continuously variable mode and an infinitely variable mode.

In some embodiments, when the first ring assembly is held fixed with the first brake and the clutch is disengaged, the infinitely variable mode is engaged. In some embodiments, the power passes through the planet carrier of the planetary gear set and to the variator carrier in the infinitely variable mode. In some embodiments, the variator provides a reverse function, a standstill function and a low speed function in the infinitely variable mode.

In some embodiments, a transition between the continuously variable/infinitely variable mode (CVP/IVP mode) and the infinitely variable (IVP) mode is accomplished by engaging/disengaging the clutch and engaging/disengaging the first brake. In some embodiments, the variator continuously changes its torque ratios in both the continuously variable mode and infinitely variable mode to optimize performance or fuel consumption. In some embodiments, the variator continuously changes its torque ratios in both the continuously variable mode and infinitely variable mode to achieve an ideal ratio for variable transmission.

In some embodiments, the CVP/IVP mode and infinitely variable mode provide a gap in rotation speeds of the second ring assembly. In one embodiment, the gap is compensated by engine speed adjustment. In some embodiments, the relationship of rotation speeds of the second ring assembly in the CVP/IVP mode and the second ring assembly in the infinitely variable mode, and the rotation speed of the input shaft from the engine is as shown in FIG. 13.

Provided herein is a vehicle driveline comprising an engine, a variable transmission of any of configuration described herein or obvious to one of skill in the art upon reading the disclosure herein, and a vehicle output. In some embodiments, the vehicle output comprises a wheel differential and one or more wheels of a vehicle. In some embodiments, the vehicle output comprises a wheel differential and a drive axle. In some embodiments, the dampener is disposed between the engine and the variable transmission. In some embodiments, the dampener comprises at least one torsional spring.

Provided herein is a method comprising providing a variable transmission of any of configuration described herein or obvious to one of skill in the art upon reading the disclosure herein.

Provided herein is a method comprising providing a vehicle driveline of any of configuration described herein or obvious to one of skill in the art upon reading the disclosure herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Besides the automatic and manual transmissions now commonly used on automobile vehicles, Continuously Variable Transmissions or CVTs have been developed. Those CVTs are of many types: belts with variable pulleys, toroidal, and conical, for non-limiting example. The principle of a CVT is that it enables the engine to run at its most efficient rotation speed by steplessly changing the transmission ratio as a function of the speed of the car and the torque demand (throttle position) of the driver. If needed for example when accelerating, the CVT can also shift to the most optimum ratio providing more power. A CVT can change the ratio from the minimum to the maximum ratio without any interruption of the power transmission, as opposed to the usual transmissions which require an interruption of the power transmission by disengaging to shift from one discrete ratio to engage the next ratio.

A specific use of CVTs is the Infinite Variable Transmission or IVT. Where the CVT is limited to positive speed ratios, the IVT configuration can perform a neutral gear and even reverse ratios steplessly. A CVT can be used as an IVT in some driveline configurations.

Figure 1:
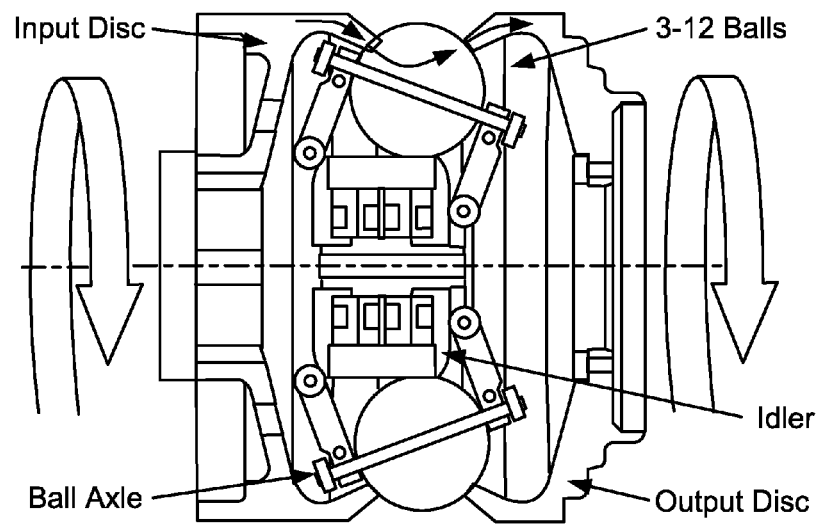
FIG. 1 is a side sectional view of a continuously variable planetary (CVP) transmission.
Figure 2:
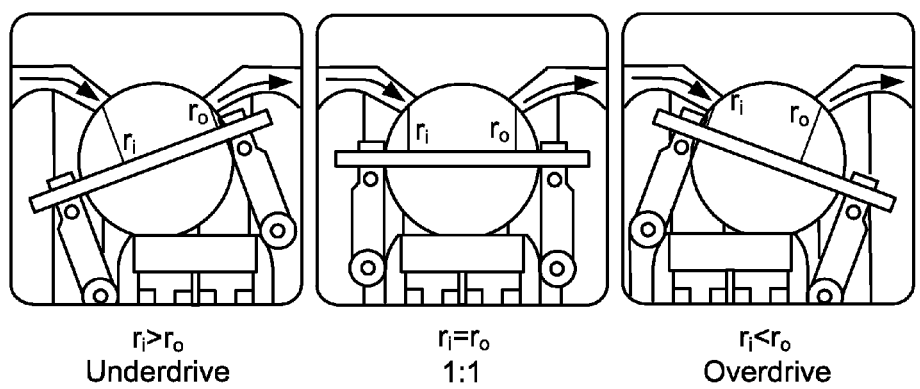
FIG. 2 is a magnified, side sectional view of a ball and ring of the CVP transmission of FIG. 1.

Provided herein are configurations based on a ball type CVT, also known as CVP, for continuously variable planetary. Aspects of the CVTs are described in US20040616399 or AU2011224083A1, incorporated herein by reference in their entirety. The type of CVT used herein is composed of a plurality of variator balls, depending on the application, two discs or annular rings each having an engagement portion that engages the variator balls. The engagement portions may be in a conical or toroidal convex or concave surface contact with the variator balls, as input and output. The CVT may include an idler contacting the balls as well as shown on FIG. 1. The variator balls are mounted on axes, themselves held in a cage or carrier allowing changing the ratio by tilting the variator balls' axes. Other types of ball CVTs also exist, like the one produced by Milner but are slightly different. These alternative ball CVTs are additionally contemplated herein. The working principle generally speaking, of a ball-type CVT is shown in FIG. 2.

The CVP itself works with a traction fluid. The lubricant between the ball and the conical rings acts as a solid at high pressure, transferring the power from the first ring assembly, through the variator balls, to the second ring assembly. By tilting the variator balls' axes, the ratio can be changed between input and output. When the axis of each of the variator balls is horizontal the ratio is one, when the axis is tilted the distance between the axis and the contact point change, modifying the overall ratio. All the variator balls' axles are tilted at the same time with a mechanism included in the cage.

Figure 3:
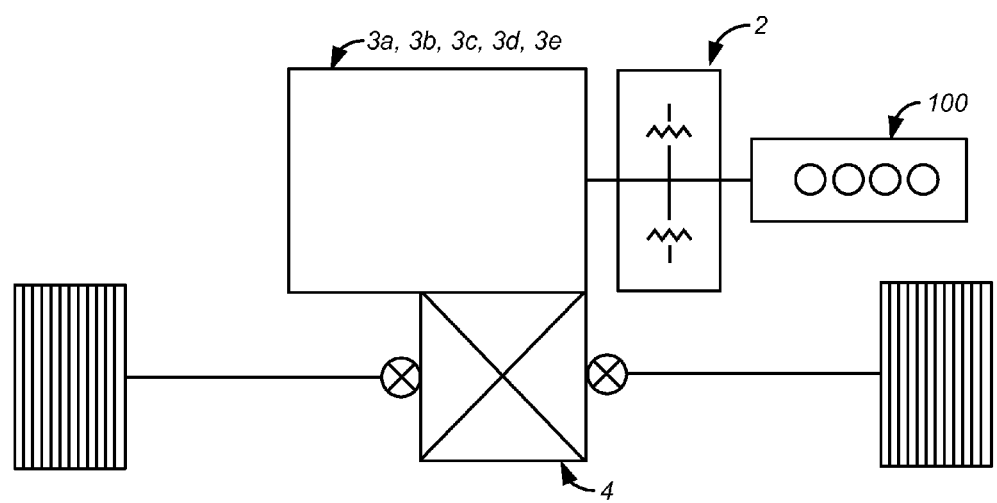
FIG. 3 is a block diagram of a continuously variable transmission (CVT) used in an automobile.

In a car, the CVT is used to replace traditional transmission and is located between the engine (ICE or internal combustion engine) and the differential as shown on FIG. 3. A torsional dampener (alternatively called a damper) may be introduced between the engine and the CVT to avoid transferring torque peaks and vibrations that could damage the CVT. In some configurations this dampener can be coupled with a clutch for the starting function.

Figure 4:
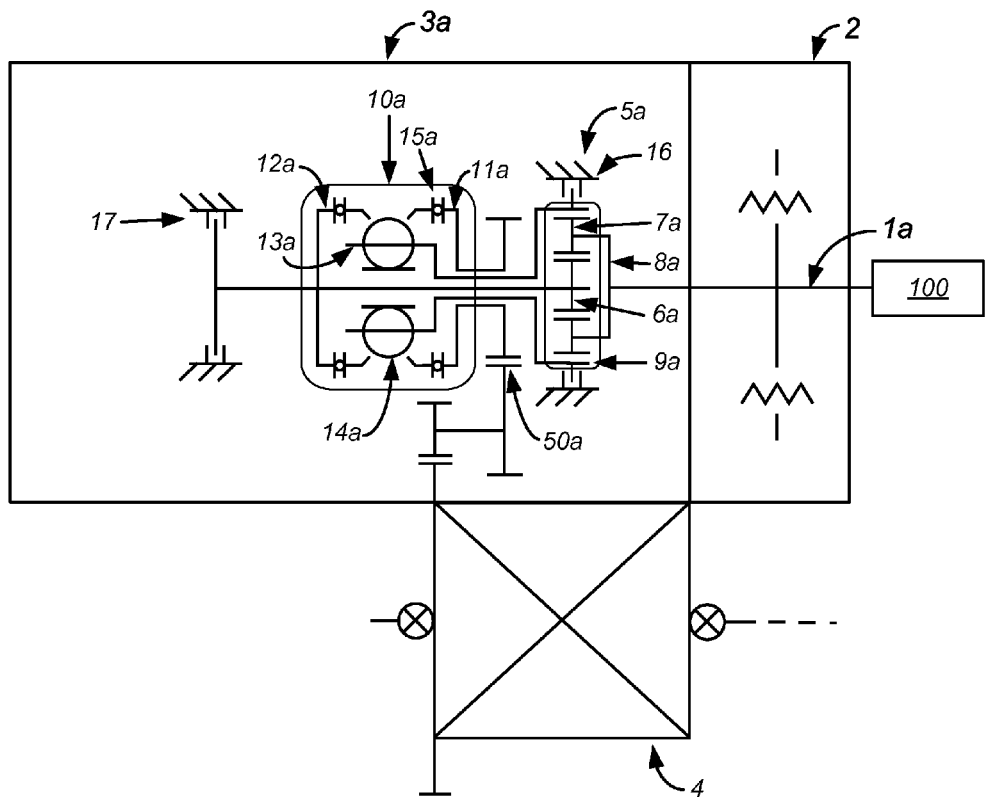
FIG. 4 is a block diagram of a continuously variable transmission (CVT) according to an embodiment of the present disclosure used in an automobile having both a continuously variable mode and an infinitely variable mode.

Embodiment transmissions (and a resulting drivelines) are shown in FIGS. 4, 6, 8, 10, and 12. The central part of these configurations is a variator, such as variator 10a (also depicted as elements 10b-e). Such variators may typically comprise the tilting ball type CVPs described above. Such variators 10a-10e typically each comprises a first ring assembly, a second ring assembly, and a carrier assembly disposed therebetween. Referring now to FIG. 4, variator 10a is shown comprising a first ring assembly 12a, a second ring assembly 11a, and a carrier assembly 13a (also referred to as a "variator carrier assembly" or "variator carrier"). The carrier assembly typically includes a plurality of variator balls having tiltable axle shafts as described herein. In some embodiments, the first ring assembly is rotatably disposed in a housing; the first ring assembly comprises a first variator ball engagement surface that is in driving engagement with a plurality of variator balls of the carrier assembly. In some embodiments the first ring assembly may be drivingly engaged with input shaft.

A first variator ball engagement surface is formed in a distal end of the first ring assembly. As meant herein, when describing the ring assemblies of a variator, distal means the portion of the ring assembly closest to the variator balls. In some embodiments, the first variator ball engagement surface is a conical surface or a concave or convex toroidal surface in contact with or slightly spaced apart from each of the variator balls. In some embodiments, the first variator ball engagement surface is in driving engagement with each of the variator balls of the carrier assembly through one of a boundary layer type friction and an elastohydrodynamic film.

The variator carrier assemblies (13a-e) of some embodiments shown in FIGS. 4, 6, 8, 10, and 12, may be rotatably disposed in the housing and is drivingly engaged with the first ring assembly. In some embodiments, the carrier assembly may comprises an annular arrangement of the plurality of tiltable variator balls each having tiltable ball axle shafts. A cage of the carrier assembly may be configured to be prevented from rotating relative to the housing by a grounding device linked to said ground. In some embodiments, each of the ball axle shafts is adjusted using a cam style tilting mechanism. In some embodiments, each of the ball axle shafts is adjusted using a split carrier axle skewing mechanism.

As depicted in FIGS. 4, 6, 8, 10, and 12, at least, the second ring assembly is rotatably disposed in the housing. The second ring assembly comprises a second variator ball engagement surface that is in driving engagement with variator balls of the carrier assembly. In some embodiments, the second variator ball engagement surface is formed in a distal end of the second ring assembly. In some embodiments, the second variator ball engagement surface is a conical surface or a concave or convex toroidal surface in contact with or slightly spaced apart from each of the variator balls. In some embodiments, the second variator ball engagement surface is in driving engagement with each of the variator balls of the carrier assembly through one of a boundary layer type friction and an elastohydrodynamic film.

A ball ramp on each side of the variator (depicted as elements 15a-e) provides the clamping force necessary to transfer the torque. Ball ramps, indicated in FIGS. 4, 6, 8, 10, and 12 by a circle between a pair of vertical lines, making up a first thrust ring on the first ring assembly and a second thrust ring on the second ring assembly are disposed between components of the variable transmission as shown to generate an amount of axial force necessary for proper operation of the variable transmission (i.e. transfer of torque); however, it is understood that the amount of axial force necessary for proper operation may be generated by a clamping mechanism (not shown) or as a load applied during assembling of the variable transmission. Thus, as depicted in FIGS. 4, 6, 8, 10, and 12, a ball ramp on each side of the variator provides the clamping force necessary to transfer the torque in this embodiment.

Provided herein is a variable transmission comprising; a power input shaft; a planetary gear set mechanically coupled to the power input shaft, a variator comprising, a variator carrier assembly, a first ring assembly, and a second ring assembly; and various combinations of brakes and clutches.

In some embodiments, the variable transmission comprises a variator having a continuously variable mode, an infinitely variable mode or a combination thereof.

In some embodiments the variable transmission can provide a reverse function, a standstill function and a low speed function.

In some embodiments, the transition between continuously variable transmission mode and infinitely variable transmission mode is accomplished by simultaneously releasing one of the brakes and applying the other brake.

In some embodiments, the transition between continuously variable transmission mode and infinitely variable transmission mode is accomplished by releasing the clutch and engaging the brake.

In some embodiments, the variator is able to continuously change its torque ratios in both the continuously variable mode and infinitely variable mode to provide the best ratio achievable for the engine to optimize performance or fuel consumption.

Provided herein is a variable transmission (VT) comprising: an input shaft; a planetary gear set drivingly engaged with the input shaft though its planet carrier; a first brake mechanically coupled to a ring gear of the planetary gear set; a variator comprising a variator carrier assembly, a first ring assembly, and a second ring assembly, the carrier of the variator mechanically coupled to a ring gear of the planetary gear set; and a second brake mechanically coupled to a sun gear of the planetary gear set and to the first ring assembly, a second ring assembly is drivingly engaged with the output of the VT. Such a variable transmission is depicted in the embodiment of FIG. 4.

FIG. 4 depicts a VT of a particular embodiment of the present invention comprising: an input shaft 1; a planetary gear set 5a drivingly engaged with the input shaft though its planet carrier 8a; a first brake 16 mechanically coupled to a ring gear 9a of the planetary gear set; a variator 10a (as described elsewhere in this application) comprising a variator carrier assembly 13a, a set of tilting balls 14a, a first ring assembly 12a, and a second ring assembly 11a, the variator carrier assembly is mechanically coupled to the ring gear 9a of the planetary gear set 5a; and a second brake 17 may be mechanically coupled to the sun gear 6a of the planetary gear set and to the first ring assembly 12a. The second ring assembly 11a is drivingly engaged with the output of the VT.

In some embodiments, the variable transmission comprises a continuously variable mode and an infinitely variable mode. In some embodiments when the first brake is engaged and the second brake disengaged, the ring gear of the planetary gear set and a variator carrier assembly (also referred to as a "variator carrier" or "carrier of the variator") are held fixed, thereby engaging the continuously variable mode. In some embodiments power may pass through the sun gear of the planetary gear set to the first ring assembly when the transmission is in continuously variable mode. For example, in the embodiment of FIG. 4: when the first brake is engaged and the second brake is disengaged, the ring gear 9a of the planetary gear set 50a and variator carrier assembly 13a are held fixed, thereby engaging a continuously variable mode.

In some embodiments when the second brake is engaged and the first brake is disengaged the sun gear of the planetary gear set and the first ring assembly are held fixed, thereby engaging an infinitely variable mode. In some embodiments, power passes through the ring gear of the planetary gear set to a carrier of the variator in the infinitely variable mode. In some embodiments, in the infinitely variable mode, the variator provides a reverse function, a standstill function, and a low speed function. For example in the embodiment of FIG. 4, when the second brake is engaged and the first brake is disengaged, the sun gear 6a of the planetary gear set 5a and the first ring assembly are held fixed, thereby engaging an infinitely variable mode. In such a mode, power may pass through the ring gear 9a of the planetary gear set 5a to the variator carrier assembly 13a.

In some embodiments, a transition between continuously variable mode and infinitely variable mode is accomplished by simultaneously releasing one of the first brake and the second brake while applying the other of the first brake and the second brake. In some embodiments, the variator continuously changes its torque ratios in both the continuously variable mode and infinitely variable mode to optimize performance or fuel consumption. In some embodiments, the variator continuously changes its torque ratios in both the continuously variable mode and infinitely variable mode to achieve an ideal ratio for variable transmission.

Figure 5:
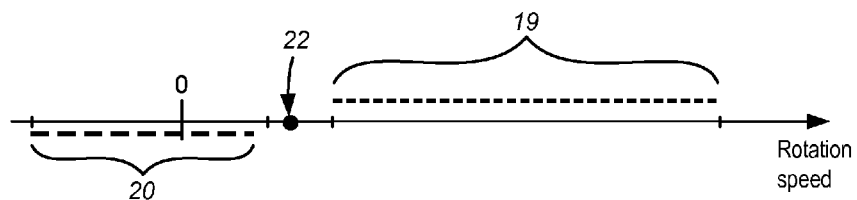
FIG. 5 is a graph of a speed diagram of the second (output) ring assembly in FIG. 4.

In some embodiments, the continuously variable mode and infinitely variable mode provide a gap in rotation speeds of the second ring assembly. In one embodiment, the gap is compensated by engine speed adjustment. In some embodiments, the relationship of rotation speeds of the second ring assembly in the continuously variable mode and the second ring assembly in the infinitely variable mode, and the rotation speed of the input shaft from the engine is as shown in FIG. 5.

Provided herein is a variable transmission comprising: an input shaft; a ring gear of the planetary gear set drivingly engaged with the input shaft; a variator comprising a variator carrier assembly, a first ring assembly, and a second ring assembly; a planetary gear carrier coupled to a first brake and to the first ring assembly; and a sun gear coupled to a second brake and a variator carrier; a second ring assembly of the variator drivingly engaged to the output of the VT.

In some embodiments, the variable transmission comprises a continuously variable mode and an infinitely variable mode. In some embodiments, when the second brake is engaged and the first brake is disengaged the sun gear of the planetary gear set is fixed together with the variator carrier assembly to engage a continuously variable mode. An example of such an embodiment is depicted in FIG. 6 and is discussed below.

In some embodiments when the first brake is engaged and the second brake disengaged an input ring assembly (typically the first ring assembly) of the variator and the planetary gear carrier (also referred to as "planet carrier" or "planetary carrier assembly") is fixed, thereby engaging an infinitely variable mode. In some embodiments, in the infinitely variable mode, the variator provides a reverse function, a standstill function, and a low speed function (forward speed). An example of such an embodiment is depicted in FIG. 6.

Figure 6:
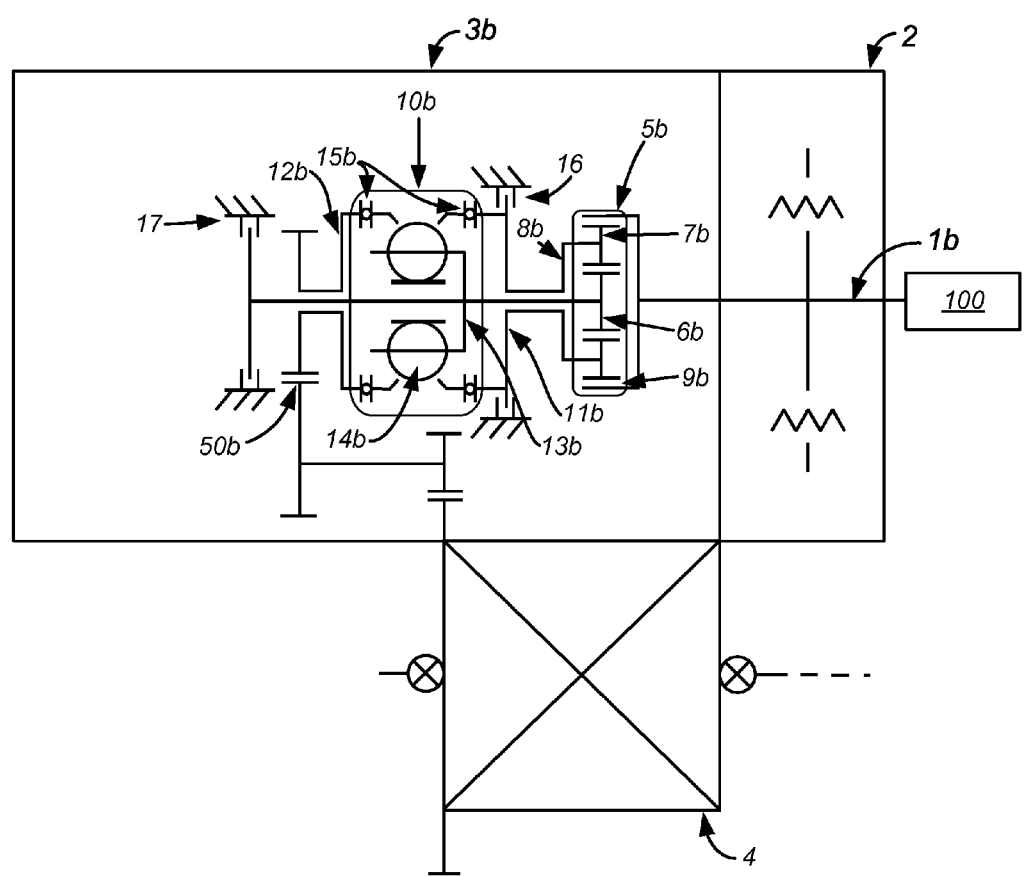
FIG. 6 is a block diagram of a continuously variable transmission (CVT) according to another embodiment of the present disclosure used in an automobile having both a continuously variable CVP mode and an infinitely variable planetary mode.

In some embodiments, an example of which is depicted in FIG. 6, a transition between continuously variable mode and infinitely variable mode is accomplished by simultaneously releasing one of the first brake and the second brake while applying the other of the first brake and the second brake.

In such embodiments, the variator continuously changes its torque ratios in both the continuously variable mode and infinitely variable mode to optimize performance or fuel consumption. In some embodiments, the variator continuously changes its torque ratios in both the continuously variable mode and infinitely variable mode to achieve an ideal ratio for variable transmission.

Figure 7:
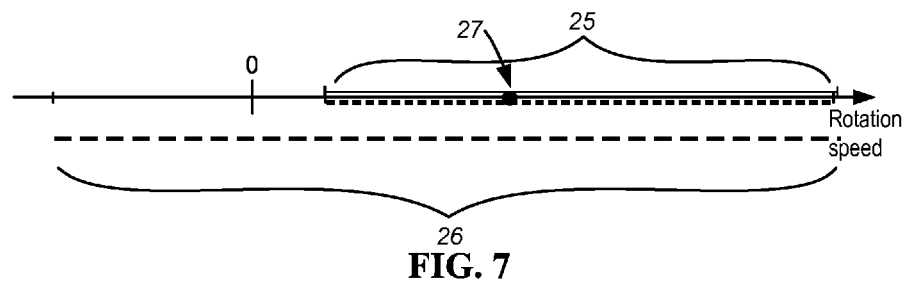
FIG. 7 is a graph of a speed diagram of the second (output) ring assembly in FIG. 6.

In some embodiments, the continuously variable mode and infinitely variable mode have overlapping rotation output speeds. For example, in the embodiment depicted in FIG. 6, the continuously variable mode and the infinitely variable mode may have overlapping rotation speeds of the second ring assembly. In some embodiments, a rotation speed range of the infinitely variable mode may be wider than the rotation speed in the continuously variable mode. FIG. 7 shows an exemplary relationship between rotation speeds of the second ring assembly in the continuously variable mode and the second ring assembly in the infinitely variable mode.

Figure 8:
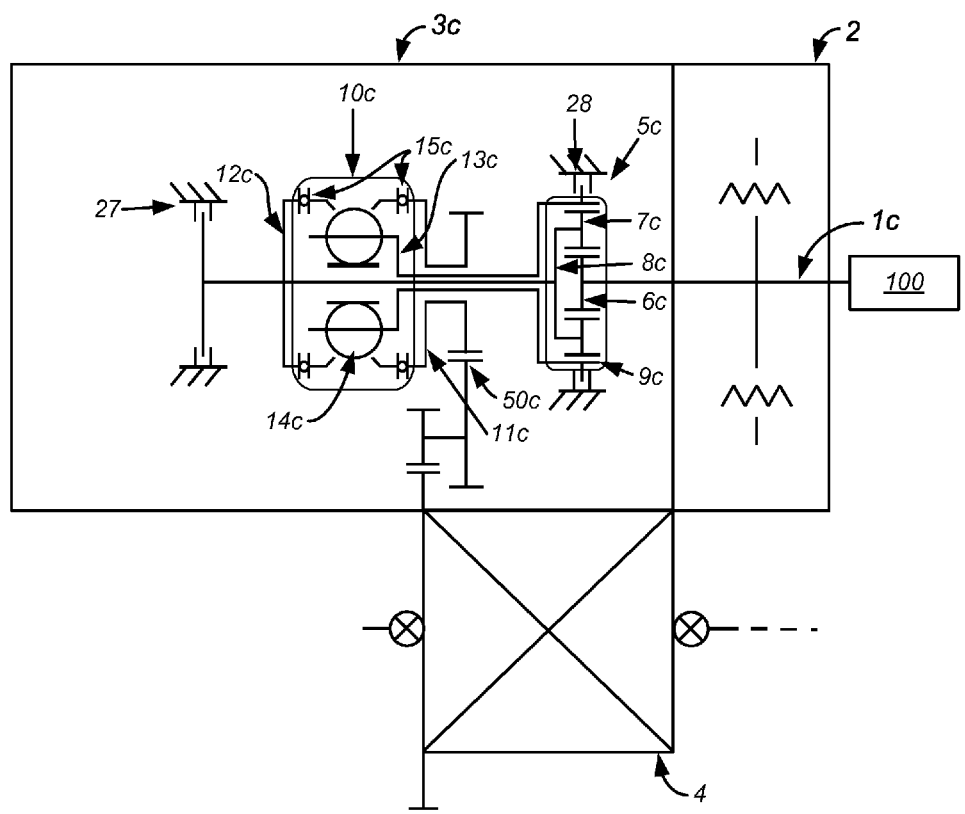
FIG. 8 is a block diagram of a continuously variable transmission CVT according to another embodiment of the present disclosure used in an automobile having both a continuously variable mode and an infinitely variable mode.

Provided herein is a variable transmission comprising: an input shaft; a variator comprising a first ring assembly, a second ring assembly, and a carrier assembly (also referred to as the "variator carrier assembly"), wherein the second ring assembly is drivingly engaged with the output of the VT; a planetary gear set comprising a sun gear drivingly engaged with the input shaft, a ring gear drivingly engaged with the variator carrier assembly, and one or more planet gears on a planet carrier (also referred to as a "planetary carrier assembly"), the planet gears disposed in mechanical engagement between the sun gear and the ring gear; a first brake coupled to the ring gear and configured to hold the ring gear fixed when the first brake is engaged; and a second brake coupled to the planet carrier and the first ring assembly, and configured to hold the planet carrier and the first ring assembly fixed when the second brake is engaged. An example of such an embodiment is depicted in FIG. 8.

In some embodiments, the variable transmission comprises a continuously variable mode and an infinitely variable mode.

In some embodiments, when the first brake is engaged and the second brake is disengaged, the ring gear and the variator carrier assembly are both fixed to engage a continuously variable mode. In some embodiments, input power passes through the planetary carrier to the first ring assembly when the transmission is in the continuously variable mode.

In some embodiments, when the second brake is engaged and the first brake is disengaged, the planet carrier and the first ring assembly are held fixed by the second brake to engage an infinitely variable mode. In some embodiments, power passes through the ring of the planetary gear set, to the variator carrier when the transmission is in the infinitely variable mode. In some embodiments, in the infinitely variable mode the variator provided a reverse function, a standstill function and a low speed function.

In some embodiments, a transition between continuously variable mode and infinitely variable mode is accomplished by simultaneously releasing one of the first brake and the second brake while applying the other of the first brake and the second brake.

In some embodiments, the variator continuously changes its torque ratios in both the continuously variable mode and infinitely variable mode to optimize performance or fuel consumption. In some embodiments, the variator continuously changes its torque ratios in both the continuously variable mode and infinitely variable mode to achieve an ideal ratio for variable transmission.

Figure 9:
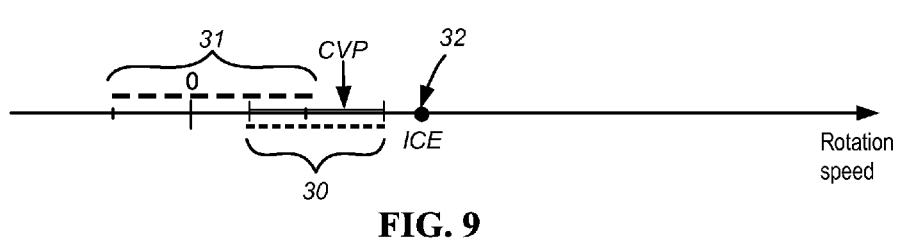
FIG. 9 is a graph of a speed diagram of the second (output) ring assembly in FIG. 8.

In some embodiments, the continuously variable mode and infinitely variable mode provide overlapping rotation speeds of the second ring assembly. In some embodiments, the continuously variable mode and infinitely variable mode have lower rotation speeds of the second ring assembly than a rotation speed of the input shaft. In some embodiments, the relationship of rotation speeds of the second ring assembly in the continuously variable mode and the second ring assembly in the infinitely variable mode, and the rotation speed of the input shaft from the engine is as shown in FIG. 9.

Provided herein is a variable transmission comprising: a variator comprising a first ring assembly, a second ring assembly drivingly engaged to the output of the VT, and a carrier assembly; a planetary gear set comprising a sun gear drivingly engaged with the input shaft, a ring gear drivingly engaged with the first ring assembly, and one or more planet gears on a planet carrier, the planet gears disposed in mechanical engagement between the sun gear and the ring gear; a first brake coupled to the first ring assembly and configured to hold the ring gear of the planetary gear set and the first ring assembly fixed when the first brake is engaged; and a second brake coupled to the planet carrier and a variator carrier of the carrier assembly, and configured to hold the planet carrier and the variator carrier fixed when the second brake is engaged.

In some embodiments, the variable transmission comprises a continuously variable mode and an infinitely variable mode.

In some embodiments, when the second brake is engaged and the first brake is disengaged, the planetary carrier assembly and the variator carrier are held fixed to engage a continuously variable mode. In some embodiments, power passes through the planetary ring gear and goes to the first ring assembly when the transmission is in the continuously variable mode.

In some embodiments, when the first brake is engaged and the second brake is disengaged, the ring gear and the first ring assembly are held fixed to engage an infinitely variable mode. In some embodiments, power passes through the planetary carrier assembly to the variator carrier assembly when the transmission is in the infinitely variable mode.

In some embodiments, in the infinitely variable mode the variator provided a reverse function, a standstill function and a low speed function. In some embodiments, a transition between continuously variable mode and infinitely variable mode is accomplished by simultaneously releasing one of the first brake and the second brake while applying the other of the first brake and the second brake.

In some embodiments, the variator continuously changes its torque ratios in both the continuously variable mode and infinitely variable mode to optimize performance or fuel consumption. In some embodiments, the variator continuously changes its torque ratios in both the continuously variable mode and infinitely variable mode to achieve an ideal ratio for the VT.

Figure 11:
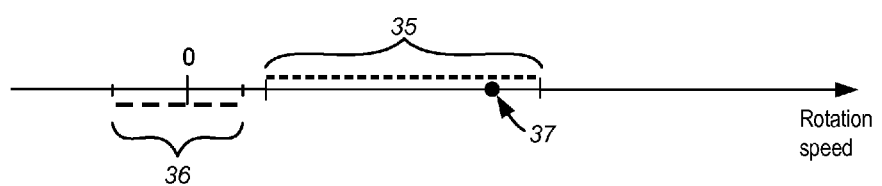
FIG. 11 is a graph of a speed diagram of the second (output) ring assembly in FIG. 10.

In some embodiments, the continuously variable mode and infinitely variable mode provide a gap in rotation speeds of the second ring assembly. In one embodiment, the gap is compensated by engine speed adjustment. In some embodiments, the relationship of rotation speeds of the second ring assembly in the continuously variable mode and the second ring assembly in the infinitely variable mode, and the rotation speed of the input shaft from the engine is as shown in FIG. 11.

Provided herein is a variable transmission comprising: an input shaft; a clutch comprising a first clutch member coupled to the input shaft and a second clutch member; a variator comprising a first ring assembly having the second clutch member formed thereon, a second ring assembly drivingly engaged to the output of the VT, and a carrier assembly; a planetary gear set comprising a sun gear drivingly engaged with the input shaft, one or more planet gears on a planet carrier (also referred to as a "planetary carrier assembly") that is drivingly engaged with the variator carrier assembly, a ring gear, wherein the ring gear of the planetary gear set is held fixed; and a first brake coupled to the first ring assembly configured to hold the first ring assembly fixed when the first brake is engaged, wherein the first ring assembly is drivingly engaged with the input shaft when the first clutch member engages the second clutch member.

In some embodiments, the variable transmission comprises a combined continuously variable/infinitely variable mode (CVP/IVP mode), or an infinitely variable mode.

In some embodiments, when the clutch is engaged, both the first ring assembly and the variator carrier are driven in order to engage the combined continuously variable/infinitely variable mode (CVP/IVP mode). In some embodiments, the variable transmission in the combined continuously variable/infinitely variable mode generates rotation speeds of the second ring assembly between speeds generated in a continuously variable mode and an infinitely variable mode.

In some embodiments, when the first ring assembly is held fixed with the first brake and the clutch is disengaged, the infinitely variable mode is engaged. In some embodiments, the power passes through the planet carrier of the planetary gear set and to the variator carrier in the infinitely variable mode. In some embodiments, the variator provides a reverse function, a standstill function and a low speed function in the infinitely variable mode.

In some embodiments, a transition between the continuously variable/infinitely variable mode (CVP/IVP mode) and the infinitely variable (IVP) mode is accomplished by engaging/disengaging the clutch and engaging/disengaging the brake. In some embodiments, the variator continuously changes its torque ratios in both the continuously variable mode and infinitely variable mode to optimize performance or fuel consumption. In some embodiments, the variator continuously changes its torque ratios in both the continuously variable mode and infinitely variable mode to achieve an ideal ratio for the VT.

Figure 13:
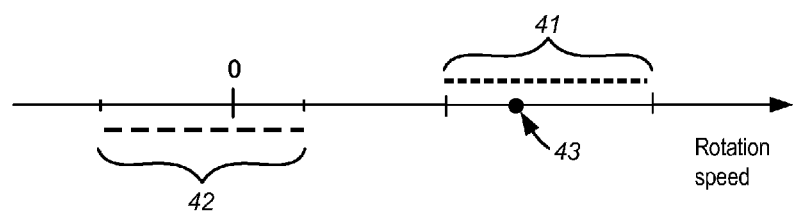
FIG. 13 is a graph of a speed diagram of the second (output) ring assembly in FIG. 12.

In some embodiments, the CVP/IVP mode and infinitely variable mode provide a gap in rotation speeds of the second ring assembly. In one embodiment, the gap is compensated by engine speed adjustment. In some embodiments, the relationship of rotation speeds of the second ring assembly in the CVP/IVP mode and the second ring assembly in the infinitely variable mode, and the rotation speed of the input shaft from the engine is as shown in FIG. 13.

Provided herein is a vehicle driveline comprising an engine, a variable transmission of any of configuration described herein or obvious to one of skill in the art upon reading the disclosure herein, and a vehicle output. In some embodiments, the vehicle output comprises a wheel differential and one or more wheels of a vehicle. In some embodiments, the vehicle output comprises a wheel differential and a drive axle. In some embodiments, the dampener is disposed between the engine and the variable transmission. In some embodiments, the dampener comprises at least one torsional spring.

Provided herein is method comprising providing a variable transmission of any of configuration described herein or obvious to one of skill in the art upon reading the disclosure herein.

Provided herein is a method comprising providing a vehicle driveline of any of configuration described herein or obvious to one of skill in the art upon reading the disclosure herein.

EXAMPLE 1

An exemplary embodiment of the invention is shown in FIG. 4 comprising CVT 3a. FIG. 4 shows CVT 3a which may be disposed within a driveline of a vehicle. The driveline may comprise a motor such as an internal combustion engine (ICE) 100, which may be connected to CVT 3a via an input shaft 1a, and may optionally feature a clutch and or damper 2 drivingly engaged therebetween. The output 50a of CVT 3a may be drivingly engaged to a vehicle differential and wheels 4. The CVT 3a of the FIG. 4 embodiment is depicted comprising: an input shaft 1a; a planetary gear set 5a drivingly engaged with the input shaft though its planet carrier (also referred to as "planetary carrier assembly") 8a; a first brake 16 mechanically coupled to a ring gear 9a of the planetary gear set; a variator 10a (as described elsewhere in this application) comprising a variator carrier assembly 13a, a set of tilting balls 14a, a first ring assembly 12a, and a second ring assembly 11a, the variator carrier assembly is mechanically coupled to the ring gear 9a of the planetary gear set 5a; and a second brake 17 may be mechanically coupled to the sun gear 6a of the planetary gear set and to the first ring assembly 12a. The second ring assembly 11a is drivingly engaged with the output 50a of the CVT. The configuration of FIG. 4 includes a continuously variable mode as well as an infinitely variable mode providing a standstill, reverse, and starting function.

The CVT 3a of FIG. 4, comprises a continuously variable mode and an infinitely variable mode. When the first brake 16 is engaged and the second brake 17 is disengaged, the ring gear 9a of the planetary gear set and the variator carrier assembly 13a (also referred to as a "variator carrier" or "carrier of the variator") are held fixed, thereby engaging the continuously variable mode. In such a mode power may pass through the sun gear of the planetary to the first ring assembly thereby allowing a continuously variable mode. The infinitely variable mode is engaged when the second brake 17 is engaged and the first brake 16 is disengaged. When the second brake is engaged and the first brake is disengaged, the first ring assembly 12a and the sun gear 6a are held fixed and the variator carrier assembly is driven by the input shaft 1a through the planet carrier 8a and ring gear 9a. Tilting the balls 14a of variator 10a will allow the second ring assembly 11a and CVT output 50a to steplessly transition from reverse to neutral to forward speeds, thereby achieving an infinitely variable mode of CVT 3a.

FIG. 5 shows the speed diagram of the planetary concept of FIG. 4.

The axis of FIG. 5 represents the rotation speed of the variator second ring assembly.

As described above, the continuously variable mode is used by applying the first brake 16, holding fixed the ring 9a of the planetary gear set 5a as well as the carrier of the variator balls (variator carrier assembly 13a). The power passes through the sun 6a and goes to the variator first ring assembly 12a. The rotation speed achievable in continuously variable mode can be observed as segment 19 on the speed diagram. The overall ratio is the product of the planetary ratio, the variator ratio and the final drive ratio.

In an infinitely variable mode, the second brake 17 is applied, holding the sun gear 6a of the planetary 5a and the first ring assembly 12a fixed. The power passes through the ring gear 9a of the planetary gear set 5a and goes to the carrier of the variator balls 13a. This mode provides a reverse function as well as a standstill and a low speed. The achievable rotation speeds in the infinitely variable mode can be observed as segment 20 on the speed diagram. The overall ratio is the product of the planetary ratio, the variator ratio and the final drive ratio. As a reference an example ICE rotation speed is shown at point 22.

A small gap may exist between the speeds ranges 19 and 20 of the continuously variable mode and infinitely variable mode and will force the engine to change its speed in order to allow all the vehicle speed. But as this gap is very small, the user will not feel it, the engine speed will only slightly vary, and this design does not need an additional gearbox to help avoid it, although one may be provided nonetheless in an alternative embodiment.

The transition between the continuously variable mode and infinitely variable mode is done by simultaneously releasing one of the first brake 16 and the second brake 17, and applying the other one. This embodiment is able to change continuously its ratio in the continuously variable mode and infinitely variable mode to provide the best ratio achievable for the engine in function of the objectives of performance or fuel consumption. In a manual or automatic transmission, only some predetermined and discrete ratios are available and an interruption of the power transmission is needed to shift the ratio. Thereby, in the embodiment of FIG. 4, the only interruptions of power in this device are the shifting of modes. An additional advantage of this configuration is that a small variator can be chosen.

EXAMPLE 2

Provided herein is an embodiment as shown in FIG. 6 comprising a planetary gear set and two brakes to hold either the carrier or the sun fixed. Such an exemplary embodiment of the invention is shown in FIG. 6 comprising CVT 3*b*. FIG. 6 shows CVT 3*b* which may be disposed within a driveline of a vehicle. The driveline may comprise a motor such as an ICE 100, which may be connected to CVT 3*b* via an input shaft 1*b*, and may optionally feature a clutch and or damper 2 drivingly engaged therebetween. The output 50*b* of CVT 3*b* may be drivingly engaged to a vehicle differential and wheels 4. The CVT 3*b* of the FIG. 6 embodiment is depicted as comprising: an input shaft 1*b*; a variator 10*b* comprising a first ring assembly 11*b*, a second ring assembly 12*b*, a variator carrier assembly 13*b*, and a set of tilting balls 14*b*; a planetary gear set 5*b* comprising a ring gear 9*b*, sun gear 6*b*, planets 7*b* and a planetary carrier assembly 8*b*; a first brake 16; a second brake 17; and a CVT output 50*b*. The configuration of FIG. 6 includes a continuously variable mode as well as an infinitely variable mode providing a standstill, reverse, and starting function.

In the embodiment of FIG. 6, the motor 100 is connected to the ring gear 9*b* of the planetary gear set 5*b* via input shaft 1*b*. The sun gear 6*b* of the gear set is connected to a second brake 17 and to the variator carrier assembly 13*b*. The planetary carrier 8*b* of the planetary gear set is linked to the first ring assembly 11*b* of the variator 10*b* and can be held fixed by a first brake 16. The second ring assembly 12*b* of the variator 10*b* is drivingly engaged to the differential (and wheels) 4 of the vehicle through CVT output 50*b*. This may be achieved using a series of gears as shown in FIG. 6 or in another manner.

FIG. 7 shows the speed diagram of the configuration shown in FIG. 6.

The axis of FIG. 7 represents the rotation speed of the variator second ring assembly.

In the embodiment of FIG. 6, the continuously variable mode is used by applying the second brake 17, holding fixed the sun 6*b* of the planetary gear set as well as the carrier of the variator 13*b*. The power passes through the ring 9*b* and goes to the first ring assembly 11*b*. The rotation speed achievable in continuously variable mode can be observed as segment 25 on the speed diagram. The overall ratio is the product of the planetary ratio, the variator ratio and the final drive ratio.

In infinitely variable mode of embodiment of FIG. 6, the first brake 16 is applied, holding the carrier of the planetary and the first ring assembly fixed. The power passes through the sun 6*b* of the planetary gear set 5*b* and goes to the variator carrier 13*b*. The power drives variator carrier 13*b* while the first ring assembly 11*b* remains stationary. As in the embodiment of FIG. 5, tilting the balls 14*b* allows the second ring assembly to steplessly transition from reverse, neutral, and forward speeds. Thus an infinitely variable mode is achieved. This mode provides a reverse function as well as a standstill and a low speed. It can be observed as segment 26 on the speed diagram of FIG. 7. An example motor speed 22 is shown as a reference. The overall ratio in the infinitely variable mode is the product of the planetary ratio, the variator ratio and the final drive ratio.

The transition between the two modes as embodied in FIG. 6 is done by simultaneously releasing one of the first and second brakes and applying the other of the first and second brakes. This device is able to change continuously its ratio to provide the best ratio achievable for the engine in function of the objectives of performance or fuel consumption. In a manual or automatic transmission, only some predetermined and discrete ratios are available and an interruption of the power transmission is needed to shift of ratio. The only interruptions of power in this device are the modes shifting.

EXAMPLE 3

Provide herein is a configuration of a variable transmission and driveline that uses a planetary gear set and two brakes to hold either the ring or the carrier fixed as shown in FIG. 8. Such an exemplary embodiment of the invention is shown in FIG. 8 comprising CVT 3*c*. FIG. 8 shows CVT 3*c* which may be disposed within a driveline of a vehicle. The driveline may comprise a motor such as an ICE 100, which may be connected to CVT 3*c* via an input shaft 1*c*, and may optionally feature a clutch and or damper 2 drivingly engaged therebetween. The output 50*c* of CVT 3*c* may be drivingly engaged to a vehicle differential and wheels 4. The CVT 3*c* of the FIG. 8 embodiment is depicted as comprising: an input shaft 1*c*; a variator 10*c*, comprising a first ring assembly 12*c*, a second ring assembly 11*c*, a variator carrier assembly 13*c*, and a set of tilting balls 14*c*; a planetary gear set 5*c* comprising a ring gear 9*c*, sun gear 6*c*, planets 7*c* and a planetary carrier assembly 8*c*; a first brake 28; a second brake 27; and the CVT output 50*c*. The configuration of FIG. 6 includes a continuously variable mode as well as an infinitely variable mode providing a standstill, reverse, and starting function. The central part of that configuration is the variator 10*c*, the operation of which is described previously in the document. A ball ramp 15*c* on each side of the variator 10*c* provides the clamping force necessary to transfer the torque. Having two brakes, this configuration includes a continuously variable mode as well as an infinitely variable mode providing a standstill, reverse and starting function. No starting device like a slipping clutch or torque converter is required, since the infinitely variable mode takes care of the starting function.

The motor 100 is connected to the sun 6*c* of the planetary gear set 5*c*. The planetary carrier 8*c* connected to the second brake 27 and then to the first ring assembly 12*c*. The ring 9*c* of the planetary gear set is linked to the carrier of the variator and can be held fixed by first brake 28.

FIG. 9 shows the speed diagram of that configuration.

The axis represents the rotation speed of the variator second ring assembly.

As depicted in FIG. 8 a continuously variable mode is used by applying the first brake 28, holding fixed the ring 9*c* of the planetary gear set as well as the variator carrier 13*c*. The power passes through the planetary carrier 8*c* and goes to the first ring assembly 12*c*. The rotation speed achievable in CVP mode can be observed as segment 30 on the speed diagram. The overall ratio is the product of the planetary ratio, the variator ratio and the final drive ratio.

In infinitely variable mode, the second brake 27 is applied, holding the carrier of the planetary gear set 8c and the first ring assembly 12c fixed. The power passes through the ring 9c of the planetary gear set 5c and goes to the carrier of the variator. In the same manner of the embodiments of FIGS. 4 and 6 this power flow allows for the second ring assembly 11c to steplessly transition between reverse, neutral and forward speeds, thereby achieving an infinitely variable mode at the CVT 3c output 50c. This mode provides a reverse function as well as a standstill and a low speed. It can be observed as segment 31 on the speed diagram. An example motor speed 32 is shown as a reference. The overall ratio is the product of the planetary ratio, the variator ratio and the final drive ratio.

The transition between the two modes as embodied in FIG. 8 is done by simultaneously releasing one of the first and second brakes and applying the other of the first and second brakes. This device is able to change continuously its ratio to provide the best ratio achievable for the engine in function of the objectives of performance or fuel consumption. In a manual or automatic transmission, only some predetermined and discrete ratios are available and an interruption of the power transmission is needed to shift of ratio. The only interruptions of power in this device are the modes shifting.

EXAMPLE 4

Figure 10:
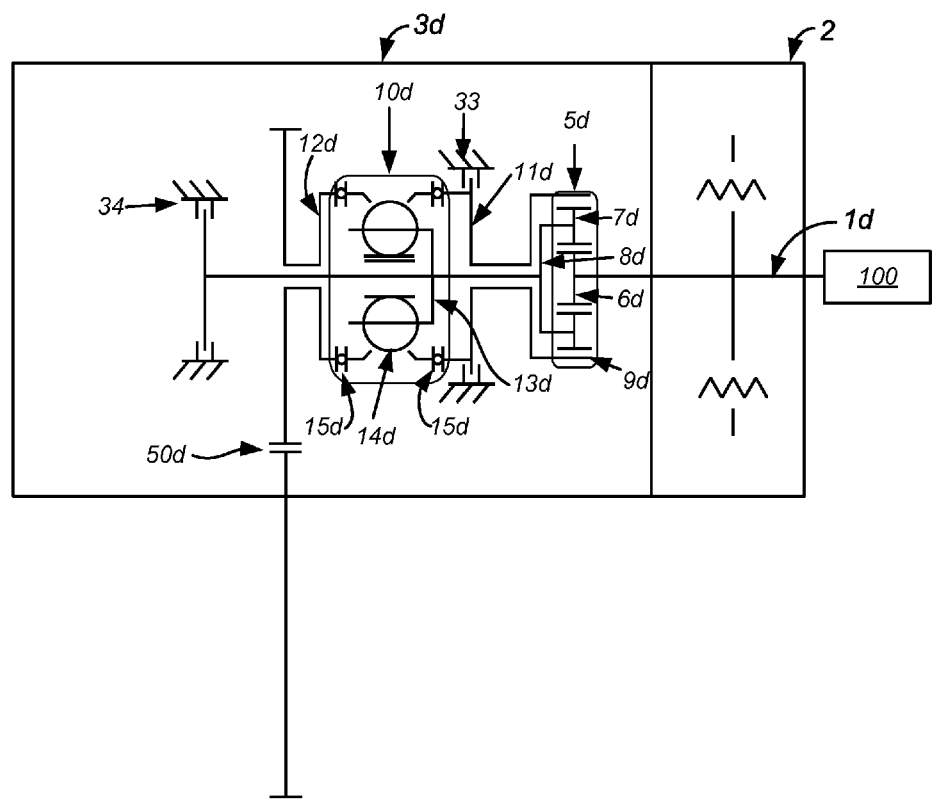
FIG. 10 is a block diagram of a continuously variable transmission (CVT) according to another embodiment of the present disclosure used in an automobile having both a continuously variable mode and an infinitely variable mode.

An exemplary embodiment of the invention is shown in FIG. 10 comprising CVT 3d. FIG. 8 shows CVT 3d which may be disposed within a driveline of a vehicle. The driveline may comprise a motor such as an ICE 100, which may be connected to CVT 3d via an input shaft 1d, and may optionally feature a clutch and or damper 2 drivingly engaged therebetween. The output 50d of CVT 3d may be drivingly engaged to a vehicle differential and wheels 4. The CVT 3d of the FIG. 10 embodiment is depicted as comprising: an input shaft 1d; a variator 10d, comprising a first ring assembly 11d, a second ring assembly 12d, a variator carrier assembly 13d, and a set of tilting balls 14d; a planetary gear set 5d comprising a ring gear 9d, sun gear 6d, planets 7d and a planetary carrier assembly 8d; a first brake 33; a second brake 34; and the CVT output 50d. As in the other embodiments the CVT output 50d may be coupled to a vehicle differential and wheels (not shown). This configuration uses a planetary gear set and two brakes to hold either the planetary ring gear 9d or the variator carrier 13d fixed. The central part of this configuration is the variator 10d (such variators are described previously in the document). A ball ramp 15d on each side of the variator provides the clamping force necessary to transfer the torque. Having two brakes, this configuration includes a continuously variable mode as well as an infinitely variable mode providing a standstill, reverse and starting function. No starting device like a slipping clutch or torque converter is required, since the infinitely variable mode takes care of the starting function.

The motor 100 (for example an internal combustion engine) is connected to the 6d of the planetary gear set via input shaft 1d. The ring 9d of the planetary gear set is connected to the first brake 33 and to the first ring assembly 11d. The planetary carrier assembly 8d is linked to the carrier of the variator 10d and can be held fixed by the second brake 34.

FIG. 11 shows the speed diagram of that configuration.

The axis represents the rotation speed of the variator second ring assembly.

Continuously variable mode is used by applying the second brake 34, holding fixed the planetary carrier 8d as well as the variator carrier assembly 13d. The power passes through the ring gear 9d and goes to the first ring assembly 11d and through the variator 10d thereby engaging the continuously variable mode. The rotation speed achievable in continuously variable mode can be observed as segment 35 on the speed diagram. The overall ratio is the product of the planetary ratio, the variator ratio and the final drive ratio.

In infinitely variable mode, the first brake 33 is applied, holding the ring gear 9d of the planetary gear set and the first ring assembly 11d fixed. The power passes through the planetary carrier 8d and goes to the variator carrier assembly 13d. As in the embodiments of FIGS. 4, 6 and 8 this thereby allows an infinitely variable mode. This mode provides a reverse function as well as a standstill and a low speed. It can be observed as segment 36 on the speed diagram of FIG. 11. An example motor speed 37 is shown as a reference. The overall ratio is the product of the planetary ratio, the variator ratio and the final drive ratio.

The transition between the two modes as embodied in FIG. 10 is done by simultaneously releasing one of the first and second brakes and applying the other of the first and second brakes. This device is able to change continuously its ratio to provide the best ratio achievable for the engine in function of the objectives of performance or fuel consumption. In a manual or automatic transmission, only some predetermined and discrete ratios are available and an interruption of the power transmission is needed to shift of ratio. The only interruptions of power in this device are the modes shifting.

EXAMPLE 5

Figure 12:
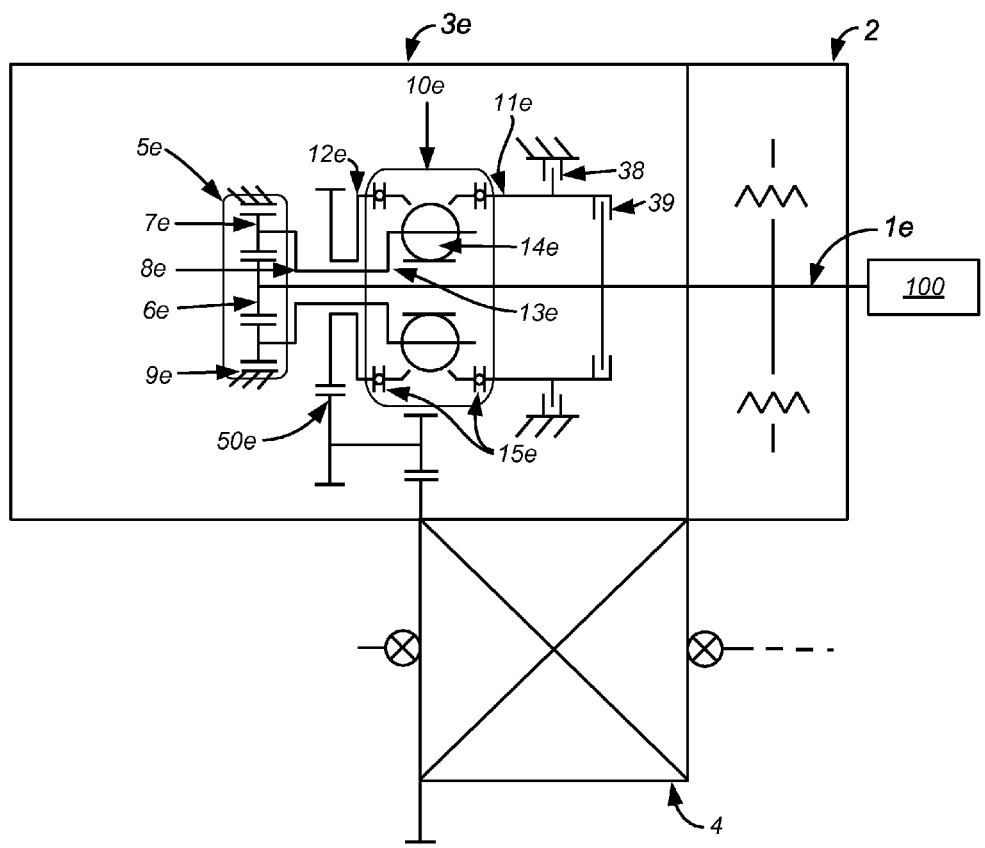
FIG. 12 is a block diagram of a continuously variable transmission (CVT) according to another embodiment of the present disclosure used in an automobile having both a continuously variable mode and an infinitely variable mode.

An exemplary embodiment of the invention is shown in FIG. 12 comprising CVT 3e. FIG. 10 shows CVT 3e which may be disposed within a driveline of a vehicle. The driveline may comprise a motor such as an ICE 100, which may be connected to CVT 3e via an input shaft 1e, and may optionally feature a clutch and/or damper 2 drivingly engaged therebetween. The output 50e of CVT 3e may be drivingly engaged to a vehicle differential and wheels 4. The CVT 3e of the FIG. 12 embodiment is depicted as comprising: an input shaft 1e; a variator 10e, comprising a first ring assembly 11e, a second ring assembly 12e, a variator carrier assembly 13e, and a set of tilting balls 14e; a planetary gear set 5e comprising a ring gear 9e, sun gear 6e, planets 7e and a planetary carrier assembly 8e; a first brake 38; a first clutch 39; and the CVT output 50e. The transmission configuration depicted in FIG. 12 uses a planetary gear set, one brake and one clutch. The central part of that configuration is the variator 10e described previously herein. A ball ramp 15e on each side of the variator 10e provides the clamping force necessary to transfer the torque. This configuration includes a continuously variable/infinitely variable mode as well as an infinitely variable mode providing a standstill, reverse and starting function. No starting device like a slipping clutch or torque converter is required, since the infinitely variable mode takes care of the starting function.

The motor 100, for example an internal combustion engine, is connected to the sun 6e of the planetary gear set 5e. The planetary carrier assembly 8e is connected to the variator carrier assembly 13e while the ring 9e of the planetary gear set 5e is always held fixed. The first ring assembly can be held by the brake 38 or connected to the engine by the clutch 39.

FIG. 13 shows the speed diagram of the configuration of FIG. 12.

The axis represents the rotation speed of the variator second ring assembly.

The infinitely variable/continuously variable mode is used by engaging the clutch 39, connecting the engine to the first ring assembly 11e, thus letting the first ring assembly and variator carrier be both driven. This infinitely variable/continuously variable mode lies in between the infinitely variable mode and the continuously variable mode concerning speeds. The overall ratio is the product of the sun planetary ratio, the variator ratio and the final drive ratio. The rotation speed achievable in infinitely variable/continuously variable mode can be observed as segment 41 on the speed diagram.

In infinitely variable mode, the brake 38 is applied, holding the first ring assembly 11e while the clutch 38 is disengaged. The power passes through the planetary carrier assembly 8e and goes to the variator carrier assembly 13e. As in previously described embodiments driving the variator carrier assembly 13e while holding the first ring assembly 11e allows stepless transitions of the second ring assembly 12e between positive negative and neutral speeds, thereby accomplishing a infinitely variable mode. This mode provides a reverse function as well as a standstill and a low speed. It can be observed as segment 42 on the speed diagram. The overall ratio is the product of the sun planetary ratio, the variator ratio and the final drive ratio.

A gap exists between the infinitely variable mode and infinitely variable/continuously variable mode and will be covered by changing the engine speed in order to allow all the vehicle speed.

The transition between the two modes is done by releasing a clutch end engaging the brake to go from the infinitely variable/continuously variable mode to the infinitely variable mode. This device is able to change continuously its ratio in the infinitely variable and infinitely variable/continuously variable modes to provide the best ratio achievable for the engine in function of the objectives of performance or fuel consumption. In a manual or automatic transmission, only some predetermined and discrete ratios are available and an interruption of the power transmission is needed to shift of ratio. The only interruptions of power in this device are the modes shifting. An additional advantage of that configuration is that a small variator can be chosen.

Embodiments of the variable transmission described herein or that would be obvious to one of skill in the art upon reading the disclosure herein are contemplated for use in a variety of vehicle drivelines. For non-limiting example, the variable transmissions disclosed herein may be used in bicycles, mopeds, scooters, motorcycles, automobiles, electric automobiles, trucks, sport utility vehicles (SUV's), lawn mowers, tractors, harvesters, agricultural machinery, all terrain vehicles (ATV's), jet skis, personal watercraft vehicles, airplanes, trains, helicopters, buses, forklifts, golf carts, motorships, steam powered ships, submarines, space craft, or other vehicles that employ a transmission.

While the figures and description herein are directed to ball-type variators (CVTs), alternate embodiments are contemplated another version of a variator (CVT), such as a Variable-diameter pulley (VDP) or Reeves drive, a toroidal or roller-based CVT (Extroid CVT), a Magnetic CVT or mCVT, Ratcheting CVT, Hydrostatic CVTs, Naudic Incremental CVT (iCVT), Cone CVTs, Radial roller CVT, Planetary CVT, or any other version CVT.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A variable transmission comprising:
   an input shaft;
   a planetary gear set having a ring gear drivingly engaged with the input shaft;
   a variator comprising a variator carrier assembly, a first ring assembly, and a second ring assembly, the second ring assembly driving engaged to an output of the variable transmission;
   a planetary gear carrier coupled to a first brake and to the first ring assembly; and
   a sun gear coupled to a second brake and a variator carrier.

2. The variable transmission of claim 1, wherein when the second brake is engaged and the first brake is disengaged, the sun gear of the planetary gear set is fixed with a carrier of the variator to engage a continuously variable mode.

3. The variable transmission of claim 1, wherein input power passes through the ring gear of the planetary gear set to the first ring assembly when the transmission is in a continuously variable mode.

4. The variable transmission of claim 1, wherein when the first brake is engaged and the second brake is disengaged, a carrier of the planetary gear set and an input ring assembly is fixed, to engage an infinitely variable mode.

5. The variable transmission of claim 1, wherein a transition between a continuously variable mode and an infinitely variable mode is accomplished by simultaneously releasing one of the first brake and the second brake while applying the other of the first brake and the second brake.

* * * * *

UNITED STATES PATENT AND TRADEMARK OFFICE
CERTIFICATE OF CORRECTION

PATENT NO. : 8,986,150 B2  Page 1 of 1
APPLICATION NO. : 14/020593
DATED : March 24, 2015
INVENTOR(S) : Mark R. J. Versteyhe et al.

It is certified that error appears in the above-identified patent and that said Letters Patent is hereby corrected as shown below:

In the Specification:

Col. 7, Ln. 19; Replace (20040616399), with US 60/616,399

Signed and Sealed this
Ninth Day of February, 2016

Michelle K. Lee
*Director of the United States Patent and Trademark Office*